US010959167B1

(12) United States Patent
Ramamurthi et al.

(10) Patent No.: US 10,959,167 B1
(45) Date of Patent: Mar. 23, 2021

(54) SYSTEM AND METHOD FOR 5G SERVICE ICON DISPLAY AND QUALITY OF SERVICE ENFORCEMENT

(71) Applicant: Verizon Patent and Licensing Inc., Basking Ridge, NJ (US)

(72) Inventors: Vishwanath Ramamurthi, San Ramon, CA (US); Maria G. Lam, Oakland, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/867,656

(22) Filed: May 6, 2020

(51) Int. Cl.
*H04W 48/16* (2009.01)
*H04M 15/00* (2006.01)
*H04W 4/24* (2018.01)

(52) U.S. Cl.
CPC ......... *H04W 48/16* (2013.01); *H04M 15/745* (2013.01); *H04W 4/24* (2013.01)

(58) Field of Classification Search
CPC ....... H04W 48/16; H04W 48/18; H04W 4/24; H04W 4/30; H04W 4/50; H04W 4/60; H04W 4/029; H04W 4/20; H04W 4/02; H04W 8/00; H04W 8/005; H04W 8/02; H04W 8/08; H04W 8/24; H04W 8/20; H04W 8/14; H04W 28/08; H04W 28/16; H04W 28/24; H04W 64/00; H04W 64/003; H04W 76/00; H04W 8/18; H04W 76/10; H04W 76/11; H04W 80/00; H04W 80/02; H04W 80/04; H04W 80/08; H04W 80/10; H04W 80/12; H04W 88/00; H04W 88/02; H04W 88/08; H04W 88/18; H04W 88/188; H04W 28/0967; H04W 28/0226; H04W 4/00; H04W 72/04; H04W 72/0453; H04M 15/00; H04M 15/745; H04M 2215/22; H04M 2215/32; H04M 1/72583; G06F 16/31; G06F 16/41; G06F 16/43
See application file for complete search history.

(56) References Cited

U.S. PATENT DOCUMENTS

| | | | |
|---|---|---|---|
| 7,409,213 B2* | 8/2008 | Bamburak et al. | 455/435.2 |
| 2008/0146223 A1* | 6/2008 | Welnick et al. | 455/434 |
| 2011/0176424 A1* | 7/2011 | Yang et al. | 370/236.2 |
| 2017/0054779 A1* | 2/2017 | Ehmann et al. | H04L 65/602 |
| 2017/0289774 A1* | 10/2017 | Kuang et al. | H04W 4/06 |
| 2018/0049209 A1* | 2/2018 | Hu et al. | H04W 72/08 |
| 2019/0124513 A1* | 4/2019 | Raleigh et al. | H04W 12/08 |
| 2019/0364520 A1* | 11/2019 | Kazmi et al. | H04W 56/00 |
| 2020/0037387 A1* | 1/2020 | Lee et al. | H04W 76/27 |

* cited by examiner

Primary Examiner — Meless N Zewdu

(57) ABSTRACT

A method, a device, and a non-transitory storage medium are described in which a mapping table is transmitted to a user device. The mapping table includes, for each entry, an index, a frequency band, and wireless services available on the frequency band. Index information corresponding to a frequency band and wireless service available in a location associated with the user device is communicated to the user device. An icon associated with the wireless service is displayed on a display of the user device. A network device determines that the user device is using the wireless service to communicate via a wireless network and transmits, to a core network, an indication that the user device is using the wireless service on the frequency band.

20 Claims, 6 Drawing Sheets

SYSTEM AND METHOD FOR 5G SERVICE ICON DISPLAY AND QUALITY OF SERVICE ENFORCEMENT

BACKGROUND

In Fifth Generation (5G) networks, different services may be provided on different frequency bands. Currently, the upper layers of a user device may not be aware of frequency bands and/or services available to the user device in order to display an icon indicating available bands and services. In addition, currently the core network may not be aware of which frequency band a user device is using. Therefore, the core network may be unable to apply appropriate policies for the services being used by the user device.

DETAILED DESCRIPTION OF PREFERRED EMBODIMENTS

Figure 1:
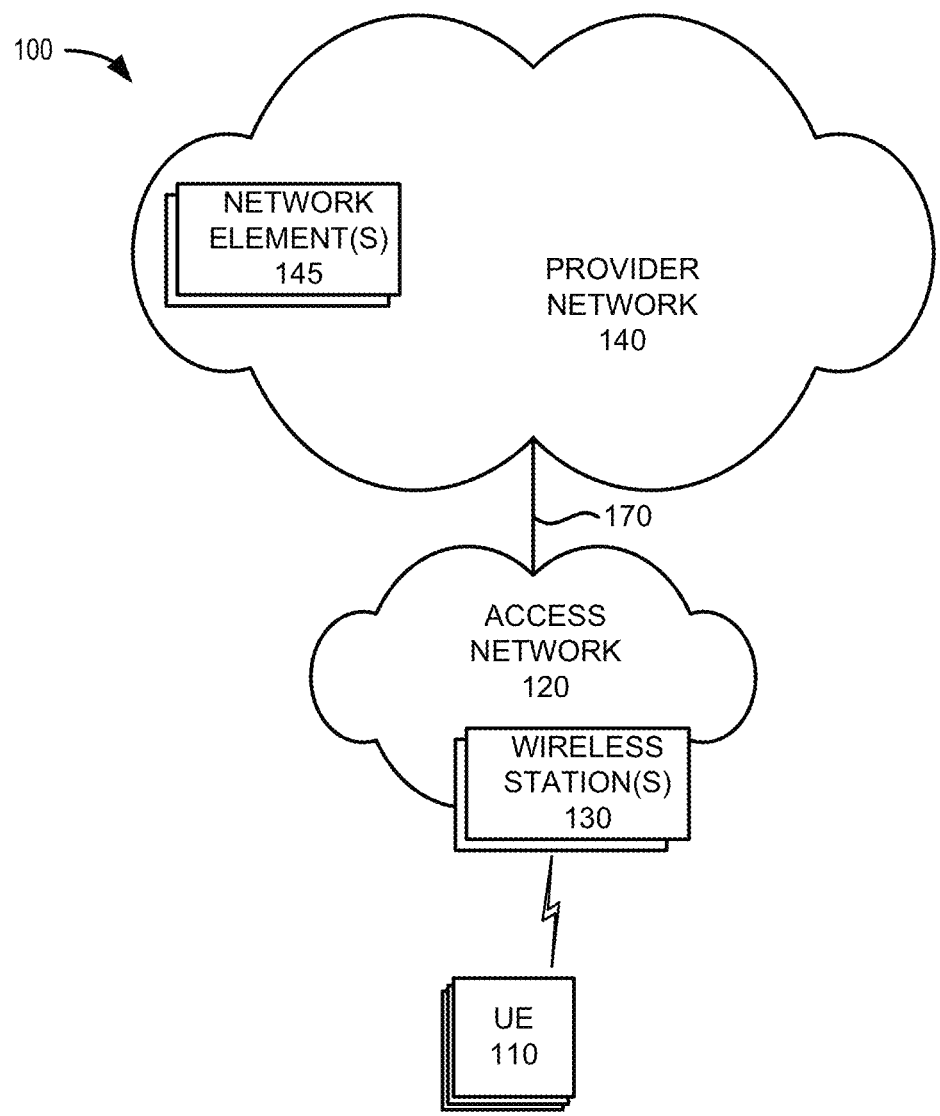
FIG. 1 is a diagram illustrating an exemplary environment in which an exemplary embodiment may be implemented.

The following detailed description refers to the accompanying drawings. The same reference numbers in different drawings may identify the same or similar elements. Also, the following detailed description does not limit the invention.

Currently, a user device on a 5G network may recognize a 5G service area based on a 1-bit indicator called the UpperLayerindicator. The UpperLayerindicator may be broadcast in a Long Term Evolution (LTE) System Information Block Type 2 (SIB2) message to a user device modem and may be passed to the upper layers of the user device. The UpperLayerindicator may indicate that a 5G network is available, but may not provide any additional information about frequency bands or services available to a user device.

A network should support various use cases, meet various performance metrics, allow for scalability and flexibility, and so forth. For example, the network may include a radio access network (RAN) and a core network that provides access to a service or application layer network, a cloud network, a multi-access edge computing (MEC) network, a fog network, and so forth. The RAN may include diverse Radio Access Technologies (RATs) (e.g., Fourth Generation (4G) wireless, 4.5G wireless, 5G wireless, backhaul/fronthaul network, LTE, LTE-Advanced (LTE-A), LTE-A Pro, future generation, etc.) that may use different segments of radio spectrum (e.g., centimeter (cm) wave, millimeter (mm) wave, mid-band below 6 Gigahertz (GHz), low-band below 2 GHz, above 6 GHz, licensed radio spectrum, unlicensed radio spectrum, particular frequency band, particular carrier frequency, etc.). Various frequency bands may have different bandwidths and may, therefore, offer different peak rates.

Different services may be available to the user device based on a number of factors, such as a location of the user device. Some base stations or areas (e.g., a wide area network (WAN), sharing areas, groups of base stations, cell areas, tracking areas, etc.) may deploy specific 5G services. For example, a base station or area may deploy a number of different services, such as ultra-wideband (UWB) services that use a very low energy level for short-range, high-bandwidth communications over a large portion of the radio spectrum; ultra-reliable low-latency communication (URLLC) services that cater to latency-sensitive applications that require uninterrupted and robust data exchange; Multi-Access Edge Computing (MEC) services that enable cloud capabilities at an edge of a wireless network; and additional services that meet International Mobile Telecommunications-2020 (IMT-2020) requirements for 5G through a wireless communication standard such as ITU-R M.2083. The different services may be available to a user device based on the base station the user device is connected to or the area in which the user device is located. The different services may be available on different frequency bands based on factors such as bandwidths, propagation characteristics, and additional factors associated with each band.

In addition, different services may be available to a user device based on a subscription level associated with the user device. In one implementation, if a user has purchased a higher subscription level, more services may be available to the user device than if the user has purchased a lower subscription level. For example, if a user has purchased a subscription level that includes UWB services, the UWB services may be available to the user device when the user device is in an area that deploys the UWB services. However, if the user has purchased a lower subscription level that does not include the UWB services, the UWB services may not be available to the user device even when the user device is in an area that deploys the UWB services.

Based on the UpperLayerindicator being passed to the upper layer of the user device, the user device may display an icon indicating the network the user device is using to connect to the wireless communications network. For example, the user device may display an "LTE" icon to indicate that the user device is connected to the communications network via an LTE network, the user device may display a "5G" icon to indicate that the user device is connected to the communications network via a 5G network, etc.

Currently, there is no way for the upper layers of a user device to differentiate between frequency bands and/or services available to the user device in an area since the lower layers of the user device pass only a 1-bit indicator indicating availability of 5G coverage in the area. Therefore, the user device may be unable to display an icon indicating which band the user device is using or which services are available to and being used by the user device. In addition, currently there is no way for the core network to identify the band the user device is using to connect to the wireless communications network. Therefore, the core network may be unable to apply appropriate policies based on the frequency band and/or the services that the user device is using.

Implementations described herein may enable the user device to display an appropriate 5G icon based on a frequency band being used by the user device and a 5G service available to the user device. In one implementation, the user device may determine the bands and services available to the user device and display an icon on the user device indicating the available services or the services that the user device is using. For example, if the user device is connected to a high bandwidth frequency band and an UWB service is available to and/or is being used by the user device, implementations herein may allow a user device to display an icon indicating that UWB services are available to and/or are being used by the user device (e.g., a "UWB" icon may be displayed in addition to, or instead of, a "5G" icon).

In one implementation, a mapping table storing frequency bands and corresponding services may be passed to user devices as a signal. An index to an available frequency band and corresponding service may be broadcast to user devices in a geographic location where the frequency band and corresponding services are available. Based on receiving an index or a plurality of indices via the broadcast, the user device may be able to reference the mapping table to determine which frequency bands and services are available to the user device.

In another implementation, the frequency bands and service information available in an area may be added to the system information and broadcast to the user devices. For example, the system information may be extended to add an information element that includes frequency range information, frequency band information, and service information. Based on the broadcasted extended system information, a user device may determine which frequency bands and services are available to the user device.

Implementations described herein may further enable the band information to be passed to the core network. For example, the core network may receive an indication of the frequency band to which the user device is connected. In this way, the core network may be able to apply appropriate policies associated with the band and/or services being used by the user device. Therefore, implementations herein may ensure that the information displayed on the user device (i.e., the icon indicating the services being used by the user device) match the policies being applied in the core network.

Implementations described herein may be applicable to both non-standalone (NSA) and standalone (SA) deployment architectures (e.g., NSA Option 3, SA Option 2, etc.). In order to expedite the adoption of 5G networks, 5G cells can be introduced into areas where 4G cells currently exist. A 5G NSA mode may be deployed where data packets are exchanged via 5G networks, and control plane functionality is supported by LTE networks, which may appear the same as LTE from a radio access technology (RAT) perspective. When 5G SA configurations are introduced, 5G networks may operate in the SA mode without the assistance of an LTE network, where the 5G network is used for both user and control planes as if another independent RAT. Implementations herein may be applicable to NSA and SA deployment architectures and to cells that initially deploy an NSA mode and later switch to an SA mode.

FIG. 1 is a diagram illustrating concepts described herein. As shown in FIG. 1, an environment 100 may include one or more user equipment (UE) devices 110, an access network 120, one or more wireless stations 130, and a provider network 140.

UE device 110 (also referred to herein as UE 110) may include a handheld wireless communication device (e.g., a mobile phone, a smart phone, a tablet device, etc.); a wearable computer device (e.g., a head-mounted display computer device, a head-mounted camera device, a wristwatch computer device, etc.); a global positioning system (GPS) device; a laptop computer, a tablet computer, or another type of portable computer; a media playing device; a portable gaming system; and/or any other type of computer device with wireless communication capabilities and a user interface. UE 110 may be used for voice communication, mobile broadband services (e.g., video streaming, real-time gaming, premium Internet access etc.), best-effort data traffic, and/or other types of applications. In other implementations, UE 110 may correspond to a wireless Machine-Type-Communication (MTC) device that communicates wirelessly with other devices over a machine-to-machine (M2M) interface.

Access network 120 may provide access to provider network 140 for wireless devices, such as UE 110. Access network 120 may enable UE 110 to connect to provider network 140 for Internet access, non-IP data delivery, cloud computing, mobile telephone service, Short Message Service (SMS) message service, Multimedia Message Service (MMS) message service, and/or other types of data services. Access network 120 may include wireless stations 130, and UE 110 may wirelessly communicate with access network 120 via wireless station 130. Access network 120 may establish a packet data network connection between UE 110 and provider network 140 via one or more Access Point Names (APNs). For example, wireless access network 120 may establish an Internet Protocol (IP) connection between UE 110 and provider network 140. In another implementation, access network may provide access to a service or application layer network, a cloud network, a MEC network, a fog network, and so forth. Furthermore, access network 120 may enable a server device to exchange data with UE 110 using a non-IP data delivery method such as Data over Non-Access Stratum (DoNAS).

Access network 120 may include a 5G access network or another advanced network, such as an LTE network. Additionally, access network 120 may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device that includes one or more devices (e.g., wireless transceivers) and other components and functionality that allow UE 110 to wirelessly connect to access network 120. Wireless station 130 may correspond to a macrocell or to a small cell (e.g., a femtocell, a picocell, a microcell, etc.). In other implementations, wireless station 130 may include another type of base station (such as an eNodeB) for another type of wireless network.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or an LTE network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE 110, and may interface with other external networks, such as private IP networks.

Wireless stations 130 may connect to provider network 140 via backhaul links 170. According to one implementation, provider network 140 may include a core network that serves as a complementary network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. For example, in one implementation, environment 100 may include a MEC network that provides applications and services at the edge of a network, such as provider network 140. Additionally or alternatively, one or more components of environment 100 may perform functions described as being performed by one or more other components of environment 100.

Figure 2:
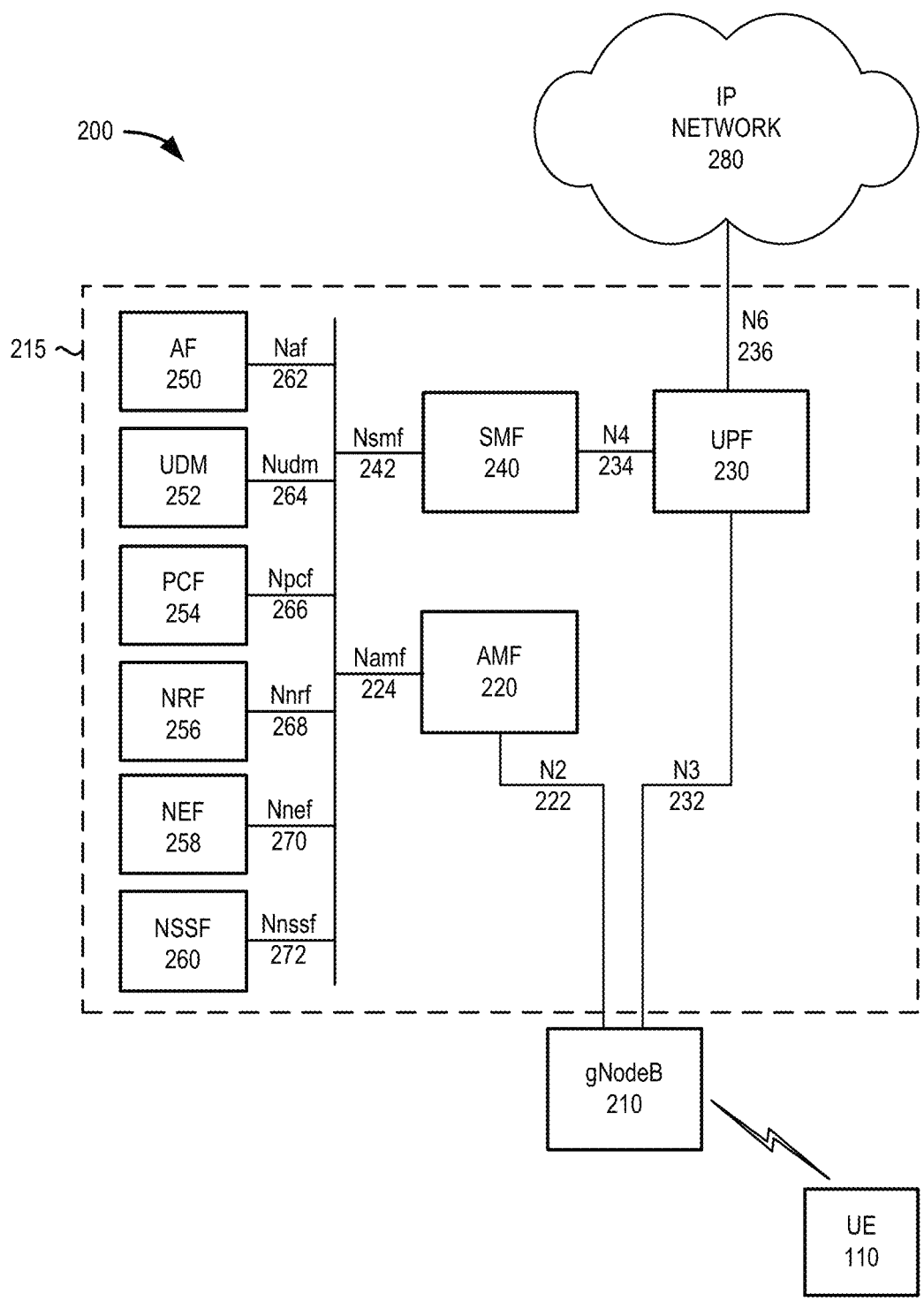
FIG. 2 illustrates an exemplary environment in which systems and methods described herein may be implemented.

FIG. 2 is a diagram illustrating a 5G network environment 200 that includes exemplary components of environment 100 according to an implementation described herein. As shown in FIG. 2, network environment 200 may include UE 110, gNodeB (gNB) 210, a core network 215, and an IP network 280. gNB 210 may correspond to one of wireless stations 130. Core network 215 and IP network 280 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Network Slice Selection Function (NSSF) 260. AMF 220, UPF 230, SMF 240, AF 250, UDM 252, PCF 254, NRF 256, NEF 258, and NSSF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and NSSF 260 for illustration purposes, in practice, FIG. 2 may include multiple gNBs 210, AMFs 220, UPFs 230, SMFs 240, AFs 250, UDMs 252, PCFs 254, NRFs 256, NEFs 258, and/or NSSFs 260.

gNB 210 may include one or more devices (e.g., wireless stations) and other components and functionality that enable UE 110 to wirelessly connect to access network 120 using 5G Radio Access Technology (RAT). For example, gNB 210 may include one or more cells, with each gNB 210 including a wireless transceiver with an antenna array configured for mm-wave wireless communication. gNB 210 may communicate with AMF 220 using an N2 interface 222 and communicate with UPF 230 using an N3 interface 232. gNB 210 may transmit frequency band and service information being used by UE 110 to core network 215 via an NG interface (not shown) in order to enable quality of service (QoS) policy implementation and enforcement for 5G services.

AMF 220 may perform registration management, connection management, reachability management, mobility management, lawful intercepts, Short Message Service (SMS) transport between UE 110 and an SMS function (not shown in FIG. 2), session management messages transport between UE device 110 and SMF 240, access authentication and authorization, location services management, functionality to support non-3GPP access networks, and/or other types of management processes. AMF 220 may be accessible by other function nodes via a Namf interface 224.

UPF 230 may maintain an anchor point for intra/inter-RAT mobility, maintain an external Packet Data Unit (PDU) point of interconnect to a data network (e.g., IP network 280, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a RAN node (e.g., gNB 210), and/or perform other types of user plane processes. UPF 230 may communicate with SMF 240 using an N4 interface 234 and connect to IP network 280 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate of charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application having an influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

NSSF 260 may select a set of network slice instances to serve a particular UE 110, determine network slice selection assistance information (NSSAI), determine a particular AMF 220 to serve a particular UE device 110, and/or perform other types of processes associated with network slice selection or management. NSSF 260 may be accessible via Nnssf interface 272.

IP network 280 may use IP to send and receive messages between one or more devices. IP network 280 may correspond to, or be included in, provider network 140.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
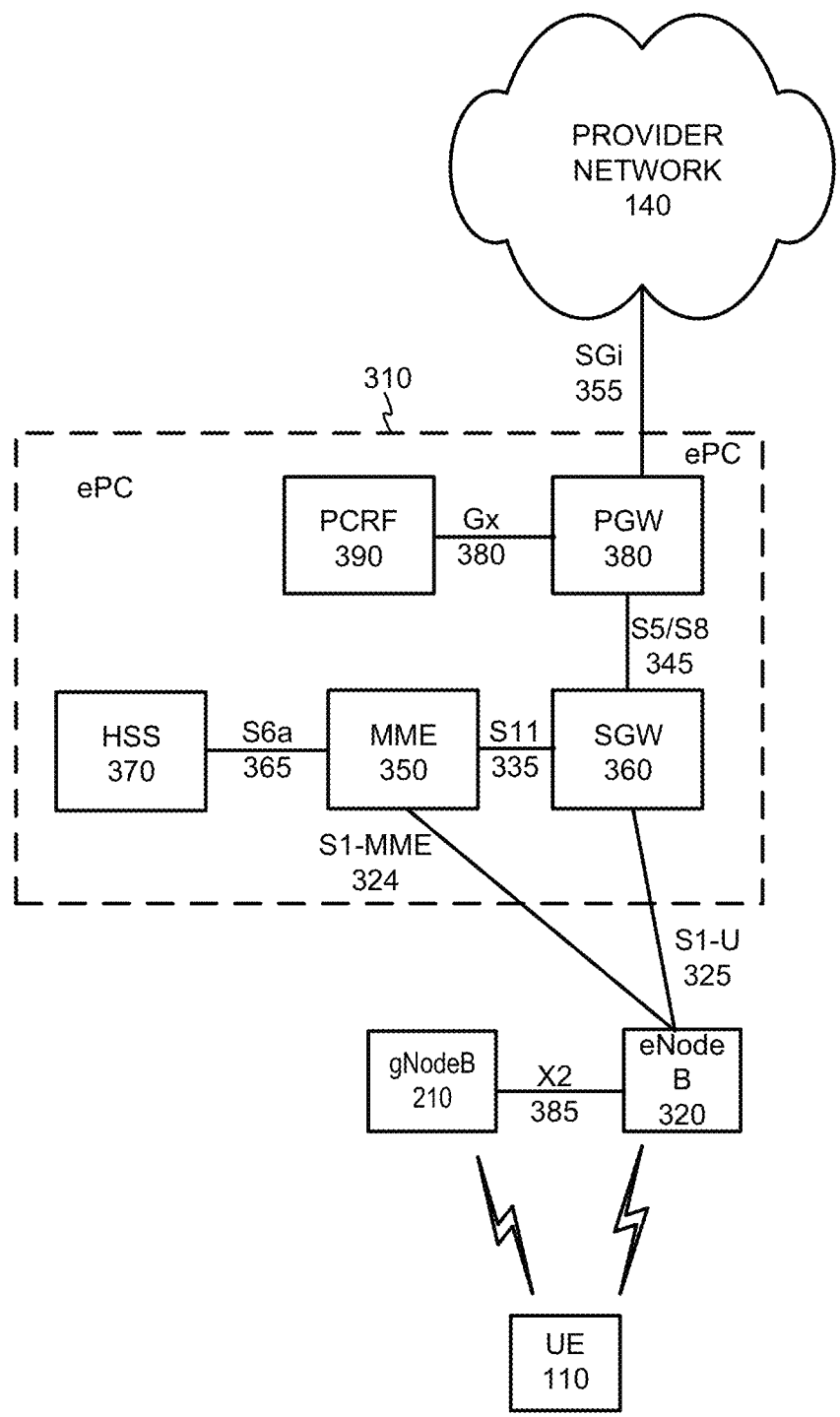
FIG. 3 is another exemplary environment in which systems and methods described herein may be implemented.

FIG. 3 is a block diagram of an exemplary networking system 300 including access network 120 in which dual capability is provided to UE 110 using an Evolved Universal Mobile Telecommunications System (UMTS) Terrestrial Radio Access Network (E-UTRAN) and 5G New Radio (NR) RAN. In networking system 300, downlink and uplink packets can be transmitted over either/both of the radio access technologies. Thus, UE 110 may connect simultaneously to 5G NR and E-UTRAN for different bearers (e.g., different logical channels with particular end-to-end QoS requirements). In such instances, depending on radio coverage, some of these bearers could be supported by different wireless stations (such as an eNodeB 320 for the E-UTRAN and gNB 210 for the 5G RN).

Access network 120 may include an LTE network with an evolved Packet Core (ePC) 310 and eNodeB 320 (corresponding, for example, to wireless station 130). UE 110 and eNodeB 320 may exchange data over a RAT based on LTE air channel interface protocols. In the embodiment shown in FIG. 3, ePC 310 may operate in conjunction with an E-UTRAN that includes at least one eNodeB 320. Networking system 300 may further include an Internet Protocol (IP) network and/or a non-IP network, which may be embodied separately or included in a backhaul network (not shown) and/or in provider network 140.

gNB 210 may include one or more devices and other components having functionality that allow UE 110 to wirelessly connect to a 5G NR RAN. eNodeB 320 and gNB 210 may communicate with each other via an X2 interface 385. X2 interface 385 may be implemented, for example, with a protocol stack that includes an X2 application protocol and Stream Control Transmission Protocol (SCTP).

EPC 310 may include one or more devices that are physical and/or logical entities interconnected via standardized interfaces. EPC 310 may provide wireless packet-switched services and wireless packet connectivity to user devices to provide, for example, data, voice, and/or multimedia services. EPC 310 may further include a mobility management entity (MME) 350, a serving gateway (SGW) 360, a home subscriber server (HSS) 370, a packet data network gateway (PGW) 380, and a Policy and Charging Rules Function (PCRF) 390. It is noted that FIG. 3 depicts a representative networking system 300 with exemplary components and configuration shown for purposes of explanation. Other embodiments may include additional or different network entities in alternative configurations than which are exemplified in FIG. 3.

Further referring to FIG. 3, eNodeB 320 may include one or more devices and other components having functionality that allows UE 110 to wirelessly connect via the RAT of eNodeB 320. ENodeB 320 may interface with ePC 310 via a S1 interface, which may be split into a control plane S1-MME interface 324 and a data plane S1-U interface 325. EnodeB 320 may interface with MME 350 via S1-MME interface 324, and interface with SGW 360 via S1-U interface 325. S1-U interface 326 may be implemented, for example, using general packet radio service (GPRS) Tunnelling Protocol (GTP). S1-MME interface 324 may be implemented, for example, with a protocol stack that includes a Non-Access Stratum (NAS) protocol and/or Stream Control Transmission Protocol (SCTP). ENodeB 320 may transmit frequency band and service information being used by UE 110 to ePC 310 via the S1 interface to enable QoS policy implementation and enforcement for 5G services when an NSA mode is being deployed.

MME 350 may implement control plane processing for both the primary access network and the secondary access network. MME 350 may select a particular SGW 360 for a particular UE 110. MME 350 may interface with other MMES (not shown) in ePC 310 and may send and receive information associated with UEs 110, which may allow one MME 350 to take over control plane processing of UEs 110 serviced by another MME 350, if the other MME becomes unavailable.

SGW 360 may provide an access point to and from UE 110, may handle forwarding of data packets for UE 110, and may act as a local anchor point during handover procedures between eNodeBs 320. SGW 360 may interface with PGW 380 through an S5/S8 interface 345. S5/S8 interface 345 may be implemented, for example, using GTP.

PGW 380 may function as a gateway to provider network 140 through a SGi interface 355. Provider network 140 may provide various services (e.g., firmware updates, over the top voice services, etc.) to UE 110. A particular UE 110, while connected to a single SGW 360, may be connected to multiple PGWs 380, one for each packet network with which UE 110 communicates.

Alternatively, UE 110 may exchange data with provider network 140 though a WiFi wireless access point (WAP) (not shown). The WiFi WAP may be part of a local area network, and access provider network 140 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 350 may communicate with SGW 360 through an S11 interface 335. S11 interface 335 may be implemented, for example, using GTPv2. S11 interface 335 may be used to create and manage a new session for a particular UE 110. S11 interface 335 may be activated when MME 350 needs to communicate with SGW 360, such as when the particular UE 110 attaches to ePC 310, when bearers need to be added or modified for an existing session for the particular UE 110, when a connection to a new PGW 380 needs to be created, or during a handover procedure (e.g., when the particular UE 110 needs to switch to a different SGW 360).

HSS 370 may store information associated with UE 110 and/or information associated with users of UE 110. For example, HSS 370 may store user profiles that include registration, authentication, and access authorization information. MME 350 may communicate with HSS 370 through an Sha interface 365. Sha interface 365 may be implemented, for example, using a Diameter protocol.

PCRF 390 may provide policy control decision and flow based charging control functionalities. PCRF 390 may provide network control regarding service data flow detection, gating, quality of service (QoS) and flow based charging, etc. PCRF 390 may determine how a certain service data flow shall be treated, and may ensure that user plane traffic mapping and treatment is in accordance with a user's subscription profile based, for example, on a specified QoS class identifier (QCI). PCRF 390 may communicate with PGW 380 using a Gx interface 380. Gx interface 380 may be implemented, for example, using a Diameter protocol.

While FIG. 3 shows exemplary components of networking system 300, in other implementations, networking system 300 may include fewer components, different components, differently arranged components, or additional components than depicted in FIG. 3. Additionally or alternatively, one or more components of networking system 300 may perform functions described as being performed by one or more other components of networking system 300.

Figure 4:
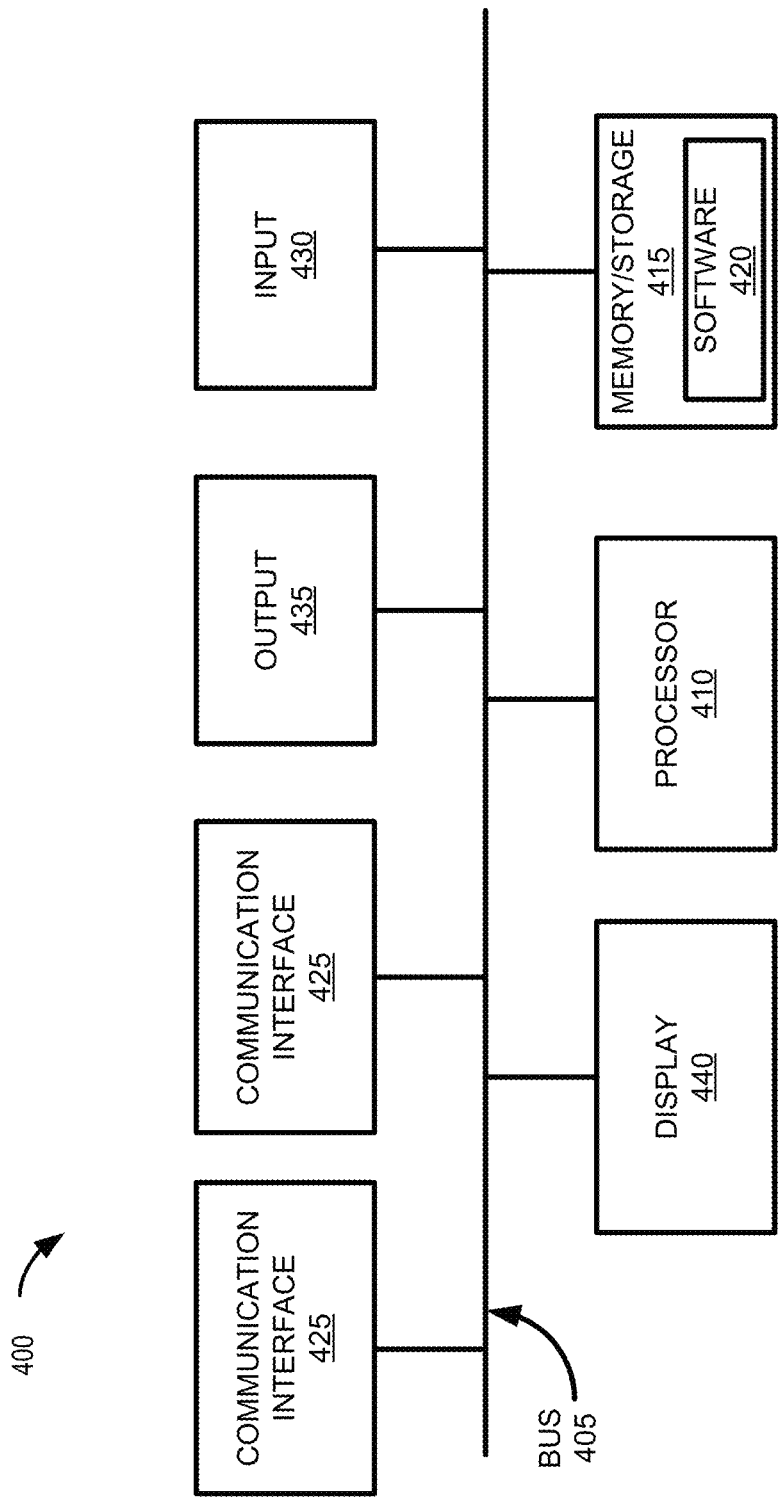
FIG. 4 is a diagram illustrating exemplary components of a device that may correspond to one or more of the devices illustrated and described herein.

FIG. 4 is a diagram illustrating example components of a device 400 according to an implementation described herein. UE device 110 and any elements of network environment 200 (e.g., gNB 210, AMF 220, UPF 230, SMF 240, etc.) or network system 300 (e.g., ePC 310, eNodeB 320, MME 350, SGW 360, etc.), and/or other components of access network 120 may each include one or more devices 400. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Additionally, for example, UE 110 and/or wireless station 130 may include logic to perform tasks, as described herein, based on software 420. In one implementation, software 420, such as an application or features of the application, may be available in different areas based on services available in the area.

Communication interface 425 permits device 400 to communicate with other devices, networks, systems, devices, and/or the like. Communication interface 425 includes one or multiple wireless interfaces and/or wired interfaces. For example, communication interface 425 may include one or multiple radio frequency (RF) transmitters and receivers, or transceivers. Communication interface 425 may include one or more antennas. For example, communication interface 425 may include an array of antennas. Communication interface 425 may operate according to a protocol stack and a communication standard. Communication interface 425 may include various processing logic or circuitry (e.g., multiplexing/de-multiplexing, filtering, amplifying, converting, error correction, etc.).

Communication interface 425 may also include a modem or an Ethernet interface to a LAN or other mechanisms for communicating with elements in a network, such as access network 120 or provider network 140 or another network. In one implementation, a modem of UE 110 may receive information indicating available frequency bands and/or services available in an area and may pass the information to upper layers of UE 110.

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a light, an output port, and/or some other type of visual, auditory, tactile, etc., output component. According to some embodiments, input 430 and/or output 435 may be a device that is attachable to and removable from device 400.

Display 440, such as a liquid crystal display (LCD), may output visual information. In some implementations, a touch screen display may act as both an input device and an output device. In one implementation, display 440 may present an icon indicating bands and/or services available in an area.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
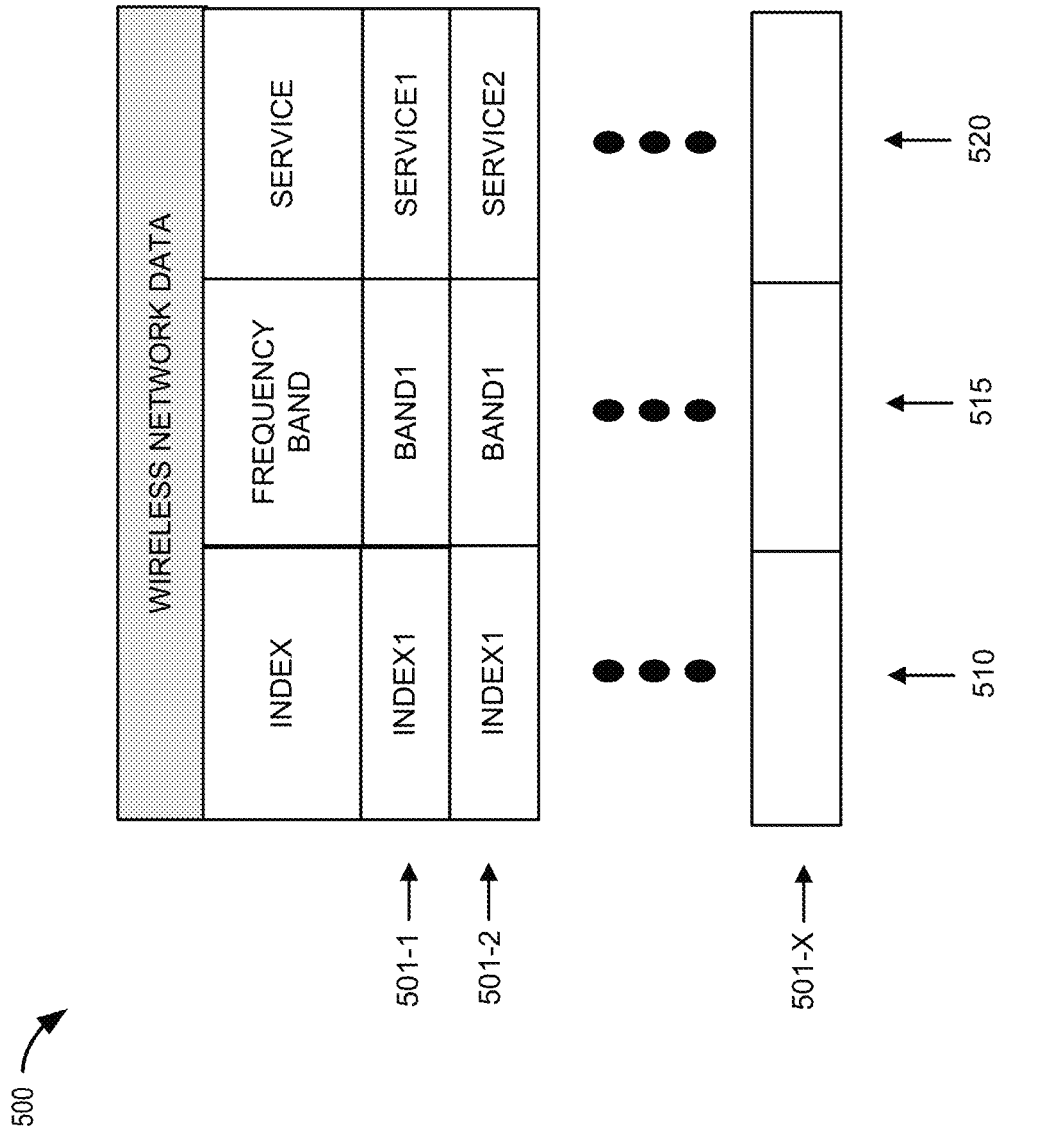
FIG. 5 is a table illustrating a mapping between frequency bands and wireless services according to an exemplary embodiment.

FIG. 5 is a diagram illustrating exemplary wireless network data that may be stored in a table 500. Table 500 may be stored, for example, in access network 120, wireless station 130, provider network 140, and/or UE 110. As illustrated, table 500 may include an index field 510, a frequency band field 515, and a service field 520. As further illustrated, table 500 includes entries 501-1 through 501-X (also referred as entries 501, or individually or generally as entry 501) that each includes a grouping of fields 510, 515, and 520 that are correlated (e.g., a record, etc.). Wireless network data is illustrated in tabular form merely for the sake of description. In this regard, wireless network data may be implemented in a data structure different from a table. The values illustrated in entries 501-1 and 501-2 are exemplary. According to other exemplary implementations, table 500 may store additional, fewer, and/or different instances of wireless network data.

Various frequency bands (e.g. 5G frequency bands) may have different bandwidths and, therefore, offer different peak rates. In addition, some base stations and/or service areas (e.g., tracking areas, cell areas, groups of base stations, etc.) may deploy specific 5G services. Table 500 may provide a mapping between frequency bands and services available in the frequency bands for a wireless network. Mapping information in table 500 may be communicated to UEs 110 using Radio Resource Control (RRC) and/or Non-Access Stratum (NAS) signaling.

Index field 510 may store data indicating an index of a corresponding frequency band/service pair. Frequency band field 515 may indicate a frequency band associated with a wireless carrier. Service field 520 may indicate a service available in a corresponding frequency band. Services available in a particular area may include, for example, UWB services, URLLC services, MEC services, and/or additional services. Services available in different frequency bands may depend on a number of different factors, such as bandwidth, propagation characteristics, network traffic/load, etc. associated with the frequency band. As shown in FIG. 5, entry 501-1 may indicate that index1 corresponds to band1 and service1 and entry 501-2 may indicate that index2 corresponds to band1 and service2.

The number of 5G frequency bands and 5G services stored in table 500 may be very large based on the number of 5G frequency bands and services that are planned to be deployed in 5G networks. Due to the large amount of data stored in table 500, it may not be feasible to broadcast all of the information in table 500 to UEs 110. In order to limit a number of bits broadcasted to UEs 110, the information stored in table 500 may be communicated to UEs 110 using RRC or NAS signaling. In addition, when a UE 110 is in a particular area, index information (such as indices stored in index field 510) associated with available frequency bands and services in the area may be broadcasted to UEs 110. In one implementation, the index information may be broadcasted as a System Information Block (SIB) message. In this way, UEs 110 may receive the index information and determine available frequency bands and services using the data in table 500.

Figure 6:
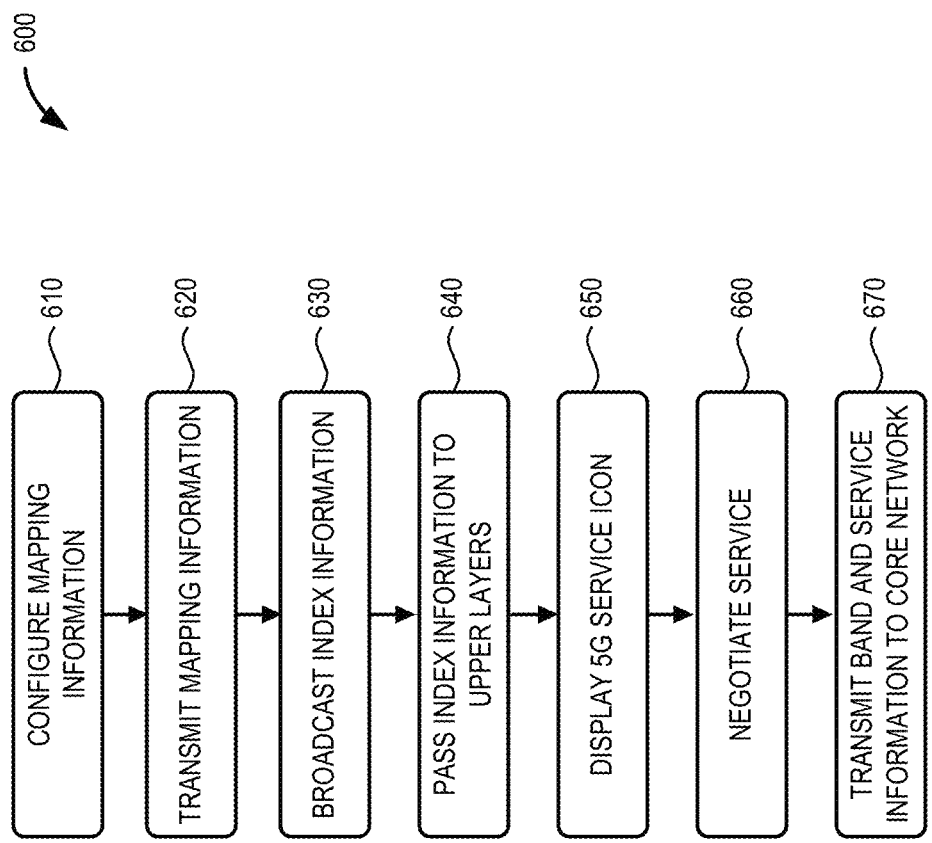
FIG. 6 is a flow diagram illustrating an exemplary process associated with icon display and quality of service enforcement according to an exemplary embodiment.

FIG. 6 is a flow diagram illustrating an exemplary process 600 for determining available frequency bands and services in an area. According to an exemplary embodiment, the steps of process 600 may be performed by UE 110, wireless station 130, and additional or different elements of environment 100.

Process 600 may begin by configuring mapping information between frequency bands and services available in the frequency bands (block 610). For example, a service provider associated with provider network 140 and/or access network 120 may generate table 500 and may configure table 500 to provide a mapping between frequency bands and wireless services available in the frequency bands for a wireless network. As discussed above, for each entry 501, table 500 may store an index, a frequency band, and a corresponding service available in the frequency band. Available services may vary based on a number of factors, such as a bandwidth of different frequency bands, propagation characteristics of different frequency bands, services available in different locations, network traffic/load, etc.

Process 600 may continue by communicating the mapping information to UE 110 (block 620). Because of the size of the information stored in mapping table 500, it may not be feasible to broadcast the mapping information to UE 110. Therefore, in one implementation, table 500 including the mapping information may be communicated to UE 110 using RRC signaling. In another implementation, table 500 and the mapping information may be communicated to UE 110 using NAS signaling.

Index information corresponding to available bands and services may be broadcasted to UE 110 (block 630). For example, particular frequency bands may be available in a particular area (e.g., tracking area, cell area, etc.). In addition, different services may be available in the different frequency bands. Index information corresponding to available frequency bands (e.g., band1) and corresponding services (e.g., service1) in table 500 may be broadcasted to UE 110. In one implementation, the index information may be broadcasted as an SIB message.

In one implementation, instead of communicating the mapping information to UE 110, system information associated with the wireless network (e.g., access network 120) may be extended to include an information element that indicates available frequency range (FR), frequency band, and available service information in an area. The extended system information may be broadcasted to UE 110. For example, the system information may be extended to include BandServiceInfo, which may include additional bits for FR, frequency band, and service, and wireless station 130 may broadcast the extended system information to UE 110. In one example, BandServiceInfo may include 8 bits with 3 bits for FR, 3 bits for band information, and 2 bits for the available services. UE 110 may receive the system information with the BandServiceInfo and may determine the index information (which includes the band and service information) to determine which bands and services are available.

The index information may be passed to the upper layers of UE 110 (block 640) and a "5G" icon corresponding to available services may be displayed on UE 110 (block 650). In one implementation, based on receiving the mapping information and the index information, UE 110 may determine the available services at the particular location in which UE 110 currently resides. In another implementation, UE 110 may determine the available services based on receiving the extended system information. Instead of displaying an icon indicating that 5G service is available, UE 110 may display an icon instead of, or in addition to, the "5G" icon indicating which particular services are currently available to UE 110. For example, if a UWB service is available, UE 110 may display a "UWB" icon in addition to, or instead of, a "5G" icon. As another example, if MEC services are available, UE 110 may display a "MEC" icon in addition to, or instead of, the "5G" icon. In one implementation, more than one icon may be displayed on UE 110 indicating more than one service that is available to UE 110.

UE 110 may negotiate a service with the wireless network (block 660). In one implementation, UE 110 may subscribe to certain services in the wireless network and UE 110 may negotiate which available services UE 110 is authorized to use. For example, UE 110 may have subscribed to a level of service that does not allow UE 110 to use all the services available in the particular location. In one implementation, UE 110 may negotiate to use an available service based on the current level of service for which UE 110 has subscribed. In another implementation, UE 110 may be given the option to upgrade to a higher level of service in order to use a different service available at the location.

When UE 110 has negotiated a service and is using the service, information indicating the frequency band and serviced being used by UE 110 may be communicated to the core network (i.e., core network 215 or ePC 310) (block 670). In this way, the core network may be able to implement and enforce QoS policies based on the particular 5G services being used by UE 110.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    transmitting, by a network device and to a user device, a mapping table, wherein the mapping table stores, for each entry of a plurality of entries, an index, a frequency band, and a wireless service available on the frequency band;
    communicating, by the network device and to the user device, index information, in said index, wherein the index information is associated with an entry, in the plurality of entries, of the mapping table corresponding to the frequency band and wireless service available in a location associated with the user device, and wherein an icon associated with the wireless service is to be displayed on a display of the user device;
    determining, by the network device, that the user device is using the wireless service to communicate via a wireless network; and
    transmitting, by the network device and to a core network, an indication that the user device is using the wireless service on the frequency band.

2. The method of claim 1, wherein transmitting the mapping table to the user device includes transmitting the mapping table using Radio Resource Control (RRC) signaling or Non-Access Stratum (NAS) signaling.

3. The method of claim 1, wherein communicating the index information includes communicating the index information using a System Information Block (SIB) message.

4. The method of claim 1, further comprising:
    determining whether the user device is subscribed to a subscription level that allows use of the wireless service; and
    authorizing the use of the wireless service when the user device is subscribed to the subscription level.

5. The method of claim 4, further comprising:
    presenting, to the user device, an option to upgrade to the subscription level when the user device is not subscribed to the subscription level.

6. The method of claim 1, wherein the information associated with the frequency band and the wireless service available in the location associated with the user device is passed to an upper processing layer of the user device to display the icon associated with the wireless service.

7. The method of claim 1, wherein the core network enforces quality of service policies associated with the wireless service based on receiving the indication that the user device is using the wireless service on the frequency band.

8. A network device comprising:
    a processor configured to:
        transmit a mapping table to a user device, wherein the mapping table stores, for each entry of a plurality of entries, an index, a frequency band, and a wireless service available on the frequency band;
        communicate index information, in said index to the user device, wherein the index information is associated with an entry, in the plurality of entries, of the mapping table corresponding to the frequency band and wireless service available in a location associated with the user device, and wherein an icon associated with the wireless service is to be displayed on a display of the user device;
        determine that the user device is using the wireless service to communicate via a wireless network; and
        transmit, to a core network, an indication that the user device is using the wireless service on the frequency band.

9. The network device of claim 8, wherein, when transmitting the mapping table to the user device, the processor is further configured to transmit the mapping table using Radio Resource Control (RRC) signaling or Non-Access Stratum (NAS) signaling.

10. The network device of claim 8, wherein, when communicating the index information, the processor is further configured to communicate the index information using a System Information Block (SIB) message.

11. The network device of claim 8, wherein the processor is further configured to:
    determine whether the user device is subscribed to a subscription level that allows use of the wireless service; and
    authorize the use of the wireless service when the user device is subscribed to the subscription level.

12. The network device of claim 11, wherein the processor is further configured to:
    present, to the user device, an option to upgrade to the subscription level when the user device is not subscribed to the subscription level.

13. The network device of claim 8, wherein the information associated with the frequency band and the wireless service available in the location associated with the user device is passed to upper layers of the user device to display the icon associated with the wireless service.

14. The network device of claim 8, wherein the core network enforces quality of service policies associated with the wireless service based on receiving the indication that the user device is using the wireless service on the frequency band.

15. A non-transitory computer-readable storage medium storing instructions executed by a processor of a device, which when executed cause the device to:

transmit a mapping table to a user device, wherein the mapping table stores, for each entry of a plurality of entries, an index, a frequency band, and a wireless service available on the frequency band;

communicate index information, in said index, to the user device, wherein the index information is associated with an entry, in the plurality of entries, of the mapping table corresponding to the frequency band and wireless service available in a location associated with the user device, and wherein an icon associated with the wireless service is to be displayed on a display of the user device;

determine that the user device is using the wireless service to communicate via a wireless network; and transmit, to a core network, an indication that the user device is using the wireless service on the frequency band.

16. The non-transitory computer-readable storage medium of claim 15, wherein the instructions to transmit the mapping table to the user device further comprise instructions, which when executed cause the device to transmit the mapping table using Radio Resource Control (RRC) signaling or Non-Access Stratum (NAS) signaling.

17. The non-transitory computer-readable storage medium of claim 15, wherein the instructions to communicate the index information further comprise instructions, which when executed cause the device to communicate the index information using a System Information Block (SIB) message.

18. The non-transitory computer-readable storage medium of claim 15, wherein the instructions further comprise instructions, which when executed cause the device to:

determine whether the user device is subscribed to a subscription level that allows use of the wireless service;

authorize the use of the wireless service when the user device is subscribed to the subscription level; and present, to the user device, an option to upgrade to the subscription level when the user device is not subscribed to the subscription level.

19. The non-transitory computer-readable storage medium of claim 15, wherein the information associated with the frequency band and the wireless service available in the location associated with the user device is passed to an upper processing layer of the user device to display the icon associated with the wireless service.

20. The non-transitory computer-readable storage medium of claim 15, wherein the core network enforces quality of service policies associated with the wireless service based on receiving the indication that the user device is using the wireless service on the frequency band.

* * * * *